United States Patent
de Lescure et al.

(10) Patent No.: US 11,956,127 B2
(45) Date of Patent: Apr. 9, 2024

(54) INCREMENTAL TOPOLOGY MODIFICATION OF A NETWORK-ON-CHIP

(71) Applicant: ARTERIS, INC., Campbell, CA (US)

(72) Inventors: Benoit de Lescure, Campbell, CA (US); Moez Cherif, Santa Cruz, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

(21) Appl. No.: 17/686,364

(22) Filed: Mar. 3, 2022

(65) Prior Publication Data

US 2022/0294704 A1   Sep. 15, 2022

Related U.S. Application Data (60) Provisional application No. 63/158,890, filed on Mar. 10, 2021.

(51) Int. Cl.
  *H04L 41/14* (2022.01)
  *G06F 15/78* (2006.01)

(52) U.S. Cl.
  CPC ........ *H04L 41/145* (2013.01); *G06F 15/7825* (2013.01)

(58) Field of Classification Search
  CPC . H04L 41/145; G06F 15/7825; G06F 30/392; G06F 30/394
  See application file for complete search history.

(56) References Cited

U.S. PATENT DOCUMENTS

| | | |
|---|---|---|
| 5,485,396 A | 1/1996 | Brasen et al. |
| 5,541,849 A | 7/1996 | Rostoker et al. |
| 5,623,420 A | 4/1997 | Yee et al. |
| 5,638,288 A | 6/1997 | Deeley |
| 5,761,078 A | 6/1998 | Fuller et al. |
| 5,887,670 A | 3/1999 | Tabata et al. |
| 5,903,886 A | 5/1999 | Heimlich et al. |
| 5,983,277 A | 11/1999 | Heile et al. |
| 6,002,857 A | 12/1999 | Ramachandran |

(Continued)

FOREIGN PATENT DOCUMENTS

| | | |
|---|---|---|
| CN | 105187313 B | 5/2018 |
| CN | 109587081 A | 4/2019 |

(Continued)

OTHER PUBLICATIONS

Alessandro Pinto et al, "System level design paradigms", ACM Transactions on Design Automation of Electronic Systems, ACM, New York, NY, US, (Jun. 7, 2004), vol. 11, No. 3, doi:10.1145/1142980.1142982, ISSN 1084-4309, pp. 537-563, XP058222500.

(Continued)

*Primary Examiner* — John A Follansbee
*Assistant Examiner* — Fadi Haj Said
(74) *Attorney, Agent, or Firm* — Dana Legal Services; Jubin Dana (57) ABSTRACT

An initial Network on Chip (NoC) topology based on a set of initial requirements is incrementally modified to satisfy a set of different requirements. Each incremental modification includes minimizing a number of changes to existing components in the initial topology. Minimizing the changes includes preserving names of the existing components in the initial NoC topology.

17 Claims, 8 Drawing Sheets

(56) References Cited

U.S. PATENT DOCUMENTS

| | | | |
|---|---|---|---|
| 6,134,705 A | 10/2000 | Pedersen et al. | |
| 6,145,117 A | 11/2000 | Eng | |
| 6,249,902 B1 | 6/2001 | Igusa et al. | |
| 6,321,363 B1 | 11/2001 | Huang et al. | |
| 6,360,356 B1 | 3/2002 | Eng | |
| 6,378,121 B2 | 4/2002 | Hiraga | |
| 6,421,321 B1 | 7/2002 | Sakagawa et al. | |
| 6,437,804 B1 | 8/2002 | Ibe et al. | |
| 6,449,761 B1 | 9/2002 | Greidinger et al. | |
| 6,622,225 B1 | 9/2003 | Kessler et al. | |
| 6,883,455 B2 | 4/2005 | Maeda et al. | |
| 6,907,591 B1 | 6/2005 | Teig et al. | |
| 7,096,436 B2 | 8/2006 | Bednar et al. | |
| 7,398,497 B2 | 7/2008 | Sato et al. | |
| 7,587,687 B2 | 9/2009 | Watanabe et al. | |
| 7,788,625 B1 | 8/2010 | Donlin et al. | |
| 8,042,087 B2 | 10/2011 | Murali et al. | |
| 8,302,041 B1 | 10/2012 | Chan et al. | |
| 8,819,611 B2 | 8/2014 | Philip et al. | |
| 9,184,998 B2 | 11/2015 | Xue | |
| 9,262,359 B1 | 2/2016 | Noice et al. | |
| 9,444,702 B1 | 9/2016 | Raponi et al. | |
| 9,569,574 B1 | 2/2017 | Khan et al. | |
| 9,792,397 B1 | 10/2017 | Nagaraja | |
| 9,825,779 B2 | 11/2017 | Ruymbeke et al. | |
| 9,940,423 B2 | 4/2018 | Lescure | |
| 10,068,047 B1 | 9/2018 | Finn | |
| 10,282,502 B1 | 5/2019 | BShara et al. | |
| 10,348,563 B2 | 7/2019 | Rao et al. | |
| 10,460,062 B2 | 10/2019 | Feld et al. | |
| 10,733,350 B1 | 8/2020 | Prasad et al. | |
| 10,922,471 B2 | 2/2021 | Baeckler et al. | |
| 10,990,724 B1 | 4/2021 | Cherif et al. | |
| 11,121,933 B2 | 9/2021 | Cherif et al. | |
| 11,281,827 B1 | 3/2022 | Labib et al. | |
| 11,449,655 B2 | 9/2022 | Cherif et al. | |
| 2003/0093765 A1 | 5/2003 | Lam et al. | |
| 2004/0040007 A1 | 2/2004 | Harn | |
| 2004/0230919 A1 | 11/2004 | Balasubramanian et al. | |
| 2005/0073316 A1 | 4/2005 | Graham | |
| 2005/0268258 A1 | 12/2005 | Decker | |
| 2007/0156378 A1 | 7/2007 | McNamara | |
| 2007/0157131 A1 | 7/2007 | Watanabe et al. | |
| 2007/0174795 A1 | 7/2007 | Lavagno et al. | |
| 2007/0186018 A1 | 8/2007 | Radulescu et al. | |
| 2008/0046854 A1 | 2/2008 | Tang | |
| 2008/0049753 A1 | 2/2008 | Heinze et al. | |
| 2008/0279183 A1 | 11/2008 | Wiley et al. | |
| 2008/0291826 A1 | 11/2008 | Licardie et al. | |
| 2009/0031277 A1 | 1/2009 | Mcelvain et al. | |
| 2009/0313592 A1 | 12/2009 | Murali et al. | |
| 2010/0061352 A1 | 3/2010 | Fasolo et al. | |
| 2010/0162189 A1 | 6/2010 | Lavagno et al. | |
| 2010/0218146 A1 | 8/2010 | Platzker et al. | |
| 2010/0274785 A1* | 10/2010 | Procopiuc | G06F 16/22 |
| | | | 707/E17.046 |
| 2011/0170406 A1 | 7/2011 | Krishnaswamy | |
| 2012/0013509 A1 | 1/2012 | Wisherd et al. | |
| 2012/0311512 A1 | 12/2012 | Michel et al. | |
| 2013/0174113 A1 | 7/2013 | Lecler et al. | |
| 2013/0208598 A1 | 8/2013 | Nakaya et al. | |
| 2013/0258847 A1 | 10/2013 | Zhang et al. | |
| 2013/0283226 A1 | 10/2013 | Ho et al. | |
| 2014/0115218 A1 | 4/2014 | Philip et al. | |
| 2014/0126572 A1 | 5/2014 | Hutton et al. | |
| 2014/0153575 A1 | 6/2014 | Munoz | |
| 2014/0160939 A1 | 6/2014 | Arad et al. | |
| 2014/0169173 A1 | 6/2014 | Naouri et al. | |
| 2014/0204735 A1 | 7/2014 | Kumar et al. | |
| 2014/0211622 A1 | 7/2014 | Kumar et al. | |
| 2014/0298281 A1 | 10/2014 | Varadarajan et al. | |
| 2014/0321839 A1 | 10/2014 | Armstrong | |
| 2015/0036536 A1* | 2/2015 | Kumar | H04L 45/06 |
| | | | 370/254 |
| 2015/0106778 A1 | 4/2015 | Mangano et al. | |
| 2015/0121319 A1 | 4/2015 | Hutton et al. | |
| 2015/0178435 A1 | 6/2015 | Kumar | |
| 2015/0254325 A1* | 9/2015 | Stringham | G06F 16/9535 |
| | | | 707/737 |
| 2015/0341224 A1 | 11/2015 | Van et al. | |
| 2015/0347641 A1 | 12/2015 | Gristede et al. | |
| 2016/0103943 A1 | 4/2016 | Xia et al. | |
| 2016/0275213 A1 | 9/2016 | Tomita | |
| 2016/0321390 A1 | 11/2016 | Bozman et al. | |
| 2017/0060204 A1* | 3/2017 | Gangwar | G06F 1/26 |
| 2017/0063734 A1 | 3/2017 | Kumar | |
| 2017/0132350 A1 | 5/2017 | Janac | |
| 2017/0177778 A1 | 6/2017 | Lescure | |
| 2017/0193136 A1 | 7/2017 | Prasad et al. | |
| 2018/0115487 A1 | 4/2018 | Thubert et al. | |
| 2018/0144071 A1 | 5/2018 | Yu et al. | |
| 2018/0227180 A1 | 8/2018 | Rao et al. | |
| 2019/0012909 A1 | 1/2019 | Mintz | |
| 2019/0073440 A1 | 3/2019 | Farbiz et al. | |
| 2019/0205493 A1 | 7/2019 | Garibay et al. | |
| 2019/0246989 A1 | 8/2019 | Genov et al. | |
| 2019/0251227 A1 | 8/2019 | Fink | |
| 2019/0260504 A1 | 8/2019 | Philip et al. | |
| 2019/0363789 A1 | 11/2019 | Lee et al. | |
| 2020/0092230 A1 | 3/2020 | Schultz et al. | |
| 2020/0162335 A1 | 5/2020 | Chen et al. | |
| 2020/0234582 A1 | 7/2020 | Mintz | |
| 2020/0366607 A1 | 11/2020 | Kommula et al. | |
| 2021/0203557 A1 | 7/2021 | Cherif et al. | |
| 2021/0320869 A1 | 10/2021 | Bourai et al. | |
| 2021/0409284 A1 | 12/2021 | Cherif et al. | |
| 2022/0294704 A1 | 9/2022 | Lescure et al. | |

FOREIGN PATENT DOCUMENTS

| | | |
|---|---|---|
| CN | 113051215 A | 6/2021 |
| CN | 113055219 A | 6/2021 |
| DE | 102015014851 A1 | 5/2016 |
| EP | 3842987 A1 | 6/2021 |
| EP | 4024262 A1 | 7/2022 |
| EP | 4057179 A1 | 9/2022 |

OTHER PUBLICATIONS

Bo Huang et al, "Application-Specific Network-on-Chip synthesis with topology-aware floorplanning", Integrated Circuits and Systems Design (SBCCI), 2012 25th Symposium on, IEEE, (Aug. 30, 2012), doi:10.1109/SBCCI.2012.6344421, ISBN 978-1-4673-2606-3, pp. 1-6, XP032471227.

David Atienza et al, Network-on-Chip Design and Synthesis Outlook, Science Direct, Integration the VLSI, Journal 41 (2008) 340-359.

Jean-Jacques Lecler et al: Application driven network-on-chip architecture exploration & refinement for a complex SoC, Design Automation for Embedded Systems, vol. 15 No. 2, Apr. 7, 2011, DOI: 10.1007/S10617-011-9075-5.

Partha et al., Design, Synthesis, and Test of Networks on Chips, IEEE (Year: 2005).

Srinivasan K et al, "Linear programming based techniques for synthesis of network-on-chip architectures", Computer Design: VLSI in Computers and Processors, 2004. ICCD 2004. Proceedings. IEEE International Conference on San Jose, CA, USA Oct. 11-13, 2004, Piscataway, NJ, USA, IEEE, (Oct. 11, 2004), doi:10.1109/ICCD.2004.1347957, ISBN 978-0-7695-2231-9, pp. 422-429, XP010736641.

Srinivasan Murali et al: "Mapping and physical planning of networks-on-chip architectures with quality-of-service guarantees", Proceedings of The 2005 Asia and South Pacific Design Automation Conference, Jan. 18, 2005, DOI: 10.1145/1120725.1120737.

Tobias Bjerregaard et al: "A Router Architecture for Connection-Oriented Service Guarantees in the Mango Clockless Network-on-Chip", Proceedings of the IEEE Conference and Exhibition on Design, Automation, and Test in Europe, Mar. 7, 2005, DOI: 10.1109/DATE.2005.36.

(56) References Cited

OTHER PUBLICATIONS

Wei Zhong et al: "Floorplanning and Topology Synthesis for Application-Specific Network-on-Chips", IEICE Transactions on Fundamentals of Electronics< Communications and Computer Sciences, Jun. 1, 2013, DOI: 10.1587/TRANSFUN.E96.A.1174.
Zhou Rongrong et al: A Network Components Insertion Method for 3D Application-Specific Network-on-Chip, Proceedings of the 11th IEEE International Conference on ASIC, Nov. 3, 2015, pp. 1-4, DOI: 10.1109/ASICON.2015.7516952.
U.S. Appl. No. 17/134,384, filed Dec. 26, 2020, Federico Angiolini.
U.S. Appl. No. 17/665,578, filed Feb. 6, 2022, K. Charles Janac.
"A distributed interleaving scheme for efficient access to wideIO dram memory", Seiculescu Ciprian, Benini Luca, De Micheli Giovanni, Codes+ISSS'12 (Year: 2012).
"Thread-Fair Memory Request Reordering"; Kun Fang, Nick Iliev, Ehsan Noohi, Suyu Zhang, and Zhichun Zhu; Dept. of ECE, Univeristy of Illinois at Chicago; JWAC-3 Jun. 9, 2012.
19th Asia and South Pacific Design Automation Conterence Alberto Ghiribaldi, Hervé Tatenguem Fankem, Federico Angiolini, Mikkel Stensgaard, Tobias Bjerregaard, Davide Bertozzi A Vertically Integrated and Interoperable Multi- Vendor Synthesis Flow for Predictable NoC Design in Nanoscale Technologies.
ACM ICCAD '06 Srinivasan Murali, Paolo Meloni, Federico Angiolini, David Atienza, Salvatore Carta, Luca Benini, Giovanni De Micheli, Luigi Raffo Designing Application-Specific Networks on Chips with Floorplan Information p. 8, Figure 8.
Annual IEEE International SoC Conference Proceedings Mohammad reza Kakoee, Federico Angiolin, Srinivasan Murali, Antonio Pullini, Ciprian Seiculescu, and Luca Benini A Floorplan-aware Interactive Tool Flow for NoC Design and Synthesis pp. 1, 2, 4 2009 Belfast, Northern Ireland, UK.
K. R. Manik et al., "Methodology for Design of Optimum NOC Based on I PG," 2017 Int'l Conference on Algorithms, Methodology, Model and Applications in Emerging Technologies (ICAM-MAET), Chennai, India, IEEE, 6 pages. (Year: 2017).
Luca Benini: "Application specific Noc design", Design, Automation and Test in Europe, 2006, Date '06 : Mar. 6-10, 2006, [Munich, Germany; Proceedings] / [Sponsored by the European Design and Automation Association], IEEE, Piscataway, NJ, USA, Mar. 6, 2006 (Mar. 6, 2006), pp. 491-495, XP058393584, ISBN: 9783981080100.
Francesco Robino: "A model-based design approach for heterogeneous NoC-based MPSoCs on FPGA", Jul. 1, 2014 (Jul. 1, 2014), XP002806918, Retrieved from the Internet: URL: http://www.divaportal.org/smash/get/diva2:718518/FULLTEXT02.pdf [retrieved on Jun. 22, 2022].
Dumitriu V et al: "Throughput-Oriented Noc Topology Generation and Analysis for High Performance SoCs", IEEE Transactions on Very Large Scale Integration (VLSI) Systems, IEEE Service Center, Piscataway, NJ, USA, vol. 17, No. 10, Oct. 1, 2009 (Oct. 1, 2009), pp. 1433-1446, XP011267808, ISSN: 1063-8210, DOI: 10.1109/TVLSI.2008.2004592.
Fangfa Fu et al: "A Noc performance evaluation platform supporting designs at multiple levels of abstraction", Industrial Electronics and Applications, 2009. ICIEA 2009. 4th IEEE Conference on, IEEE, Piscataway, NJ, USA, May 25, 2009 (May 25, 2009), pp. 425-429, XP031482069, ISBN: 978-1-4244-2799-4 abstract p. 426-p. 429.
Murali et al: "Synthesis of Predictable Networks-on-Chip-Based Interconnect Architectures for Chip Multiprocessors", IEEE Transactions on Very Large Scale Integration (VLSI) Systems, IEEE Service Center, Piscataway, NJ, USA, vol. 15, No. 8, Aug. 1, 2007 (Aug. 1, 2007) , pp. 869-880, XP011187732, ISSN: 1063-8210, DOI: 10.1109/TVLSI.2007.900742.
Picornell Tomas Tompic@Gap.Upv.Es et al: "DCFNoC a Delayed Conflict-Free Time Division Multiplexing Network on Chip", Designing Interactive Systems Conference, ACM, 2 Penn Plaza, Suite 701 New York NY10121-0701 USA, Jun. 2, 2019 (Jun. 2, 2019), pp. 1-6, XP058637807, DOI: 10.1145/3316781.3317794 ISBN: 978-1-4503-5850-7.
Anonymous: "Network on a chip—Wikipedia", Jun. 15, 2021, https://en.wikipedia.org/w/index.php?title=Network_on_a_chip &oldid-1028654828.
Haytham Elmiligi et al: "Networks-on-chip topology optimization subject to power, delay, and reliability constraints", IEEE International Symposium on Circuits and Systems, May 30, 2010, pp. 2354-2357 DOI: 10.1109/ISCAS.2010.5537194.
Jain R. et al: "Predicting system-level area and delay for pipelined and nonpipelined designs", IEEE Transactions on Computer Aided Design of Integrated Circuits and Systems, vol. 11, No. 8, Jan. 1, 1992, pp. 955-965, DOI: 10.1109/43.149767.
Jingye Xu et al: "Latch Based Interconnect Pipelining for High Speed Integrated Circuits", Proceedings of The International Conference on Electro/Information Technology, May 1, 2006, pp. 295-300 DOI: 10.1109/EIT.2006.252152.
Jun Minje et al: "Exploiting Implementation Diversity and Partial Connection of Routers in Application-Specific Network-on-Chip Topology Synthesis", IEEE Transactions on Computers, IEEE, USA, vol. 63, No. 6, Jun. 1, 2014 (Jun. 1, 2014), pp. 1434-1445, XP011550397, ISSN: 0018-9340, DOI: 10.1109/TC.2012.294.
Saponara S et al: "Design and coverage-driven verification of a novel network-interface IP macrocell for network-on-chip interconnects", Microprocessors and Microsystems, vol. 35, No. 6 , pp. 579-592, XP028255708 ISSN: 0141-9331, DOI: 10.1016/J.MICPRO. 2011.06.005.
Saponara Sergio et al: "Configurable network-on-chip router macrocells", Microprocessors and Microsystems, IPC Business Press Ltd. London, GB, vol. 45, Apr. 29, 2016 (Apr. 29, 2016), pp. 141-150 XP029678799, ISSN: 0141-9331, DOI: 10.1016/J.MICPRO. 2016.04.008.
Song Z et al: "A NoC-Based High Performance Deadlock Avoidance Routing Algorithm", Computer and Computational Sciences, 2008. IMSCCS '08. International Multisymposiums on, IEEE Piscataway, NJ, USA, Oct. 18, 2008, pp. 140-143, XP031411025, ISBN: 978-0-7695-3430-5.
Anonymous: "Intel Hyperflex Architecture HighPerformance Design Handbook", Oct. 4, 2021 (Oct. 4, 2021), pp. 1-147, XP093063924, Retrieved from the Internet: URL:https://cdrdv2.intel.com/vl/dl/getContent/667078?fileName=sI0_hp_hb-683353-667078.pdf.
Ken Eguro et al: "Simultaneous Retiming and Placement for Pipelined Net lists", Proceedings of The 16th International Symposium on Field-Programmable Custom Computing Machines, Apr. 14, 2008 (Apr. 14, 2008), pp. 139-148, XP031379339.

* cited by examiner

INCREMENTAL TOPOLOGY MODIFICATION OF A NETWORK-ON-CHIP

FIELD

The present technology is in the field of system design and, more specifically, related to topology synthesis to generate a network-on-chip (NoC) description.

BACKGROUND

Multiprocessor systems have been implemented in systems-on-chips (SoCs) that communicate through special networks used to handle communication between Intellectual Property (IP) units of SoCs. One example of a special network is a network-on-chip (NoC). A typical SoC includes instances of sources or initiators IPs and sinks or target IPs. Transactions are sent from an initiator to one or more targets using industry-standard protocols. The initiator, connected to the NoC, sends a request transaction to a target, using an address to select the target. The NoC decodes the address and transports the request from the initiator to the target. The target handles the transaction and sends a response transaction, which is transported by the NoC back to the initiator.

Typically, during design, a synthesis tool generates a NoC description based on a set of requirements. The result has been processed through the ASIC design flow with logic synthesis and place and route steps performed. The steps typically take a lot of time, e.g., multiple days.

After this first generation, it is decided to remove a component from the SoC, which results in a slight modification of the floorplan and the connectivity in light of the impact on the set of requirements. The synthesis tool generating the NoC topology is run again with the updated requirements. The tool gives a completely different result compared to the first run. As such, all the previous work on logic synthesis and place and route needs to be performed again from scratch, even if the modification was very small. This is very costly.

When designing large SoCs that contain one or more NoCs, the designer may have to perform the configuration of the NoC topology iteratively, doing numerous small changes as the design progresses. Examples of the changes include adding or removing components connected to the NoC; changing the logical connectivity between source and sinks of traffic in the NoC; changing parts of the floorplan resulting in new physical constraints for the NoC implementation, such as new blockages or new free space to place the logic elements that compose the NoC on the chip; and changing the required performance, for instance modifying the required minimum bandwidth between a source and a sink, or changing the clock frequency of some elements, or changing the path width of some elements.

When such changes need to be made, the changes have an impact on the NoC topology, which is no longer fulfilling the new requirements. The existing NoC topology is modified to account for the changes or the new needs/requirements. While doing so, an attempt will be made to minimize the number of changes in the NoC to preserve implementation so that parts that are not impacted by the changes remains minimally modified. For instance, attempts will be made to preserve implementations of existing logic synthesis and/or place and route. This task is difficult and error prone.

There is a need for a tool that takes, as input, the existing NoC topology and updated requirements to generate a modified NoC topology that fulfills the updated requirements.

SUMMARY

In accordance with various embodiments and aspects herein, systems, methods and computer-readable media take, as input, an existing NoC topology and generate an updated NoC topology that fulfills updated/new requirements, yet minimizes delays and errors that result from incremental synthesis runs, such as two consecutive synthesis runs, when there is an update/new requirement.

DETAILED DESCRIPTION

The following describes various examples of the present technology. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with the embodiment is included in at least one embodiment.

As used herein, a "source" and an "initiator" refer to similar intellectual property (IP) modules or units and the terms are used interchangeably within the scope and embodiments. As used herein, a "sink" and a "target" refer to similar IP modules or units and the terms are used interchangeably within the scope and embodiments. As used herein, a transaction may be a request transaction or a response transaction. Examples of request transactions include write request and read request.

Thus, appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments described herein are merely exemplary, and should not be construed as limiting of the scope or spirit of the invention as appreciated by those of ordinary skill in the art. All statements herein reciting principles, aspects, and embodiments are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

Figure 1:
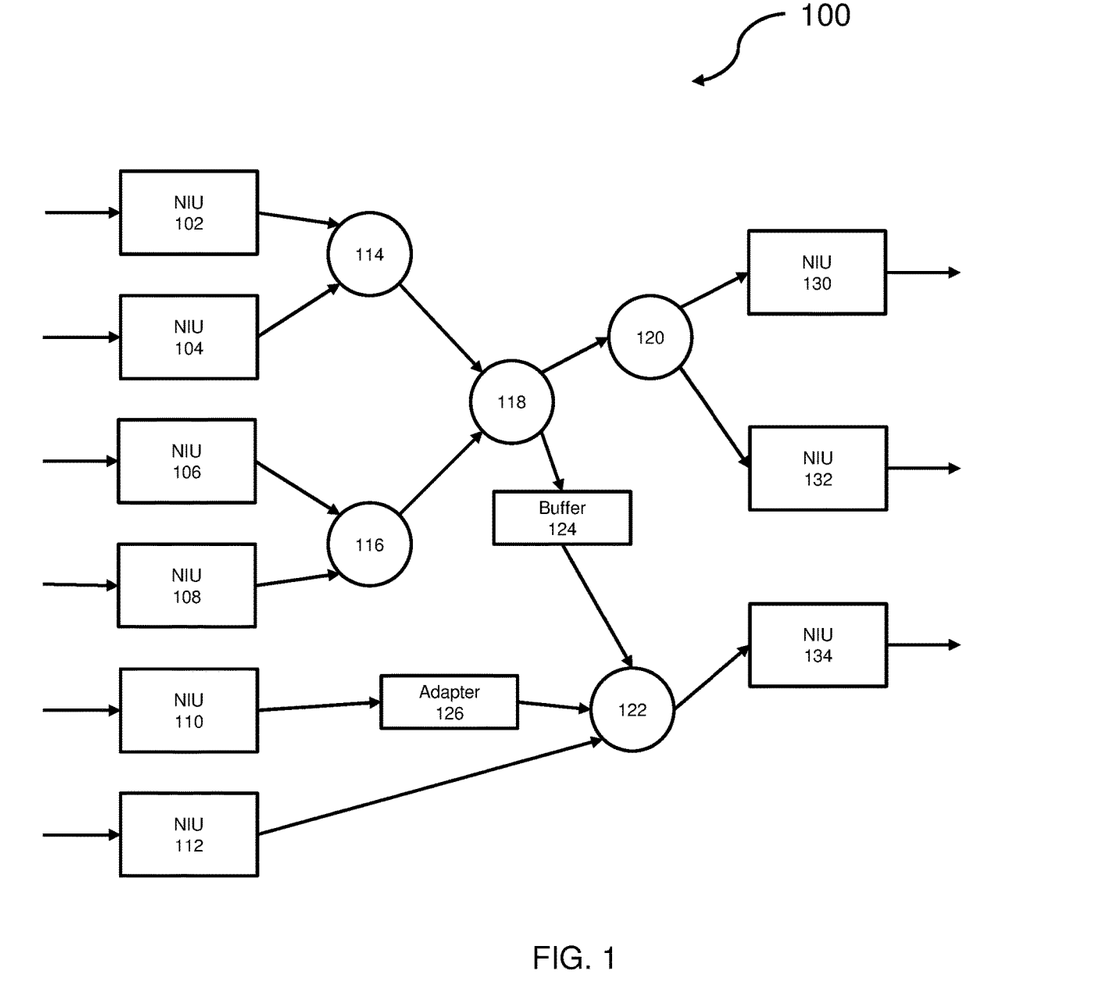
FIG. 1 shows a logic view of a network-on-chip (NoC) that includes various elements in accordance with various aspects and embodiments of the invention.

Referring now to FIG. 1, an example of a network-on-chip (NoC) 100 is shown. The NoC 100 uses elementary network functions that are assembled, such as network interface units (NIUs) 102, 104, 106, 108, 110, 112, 130, 132, and 134, switches 114, 116, 118, 120, and 122, adapters 126, and buffers 124. Elementary network functions of the NoC 100 may use an internal transport protocol, which is specific to the NoC 100, to communicate with each other, typically based on the transmission of packets. The NIUs 102, 104, 106, 108, 110, 112, 130, 132, and 134 convert the protocol used by the attached system-on-chip (SoC) unit (not shown), into the transport protocol used inside the NoC 100. The switches 114, 116, 118, 120, and 122 route flows of traffic between source and target destinations. The buffer 124 is used to insert pipelining elements to span long distances, or to store packets to deal with rate adaptation between fast senders and slow receivers or vice-versa. The adapter 126 handles various conversions between data width, clock, and power domains. The NoC 100 may be implemented in an SoC with digital logic, such as logic gates and sequential elements (flip-flops).

Figure 2:
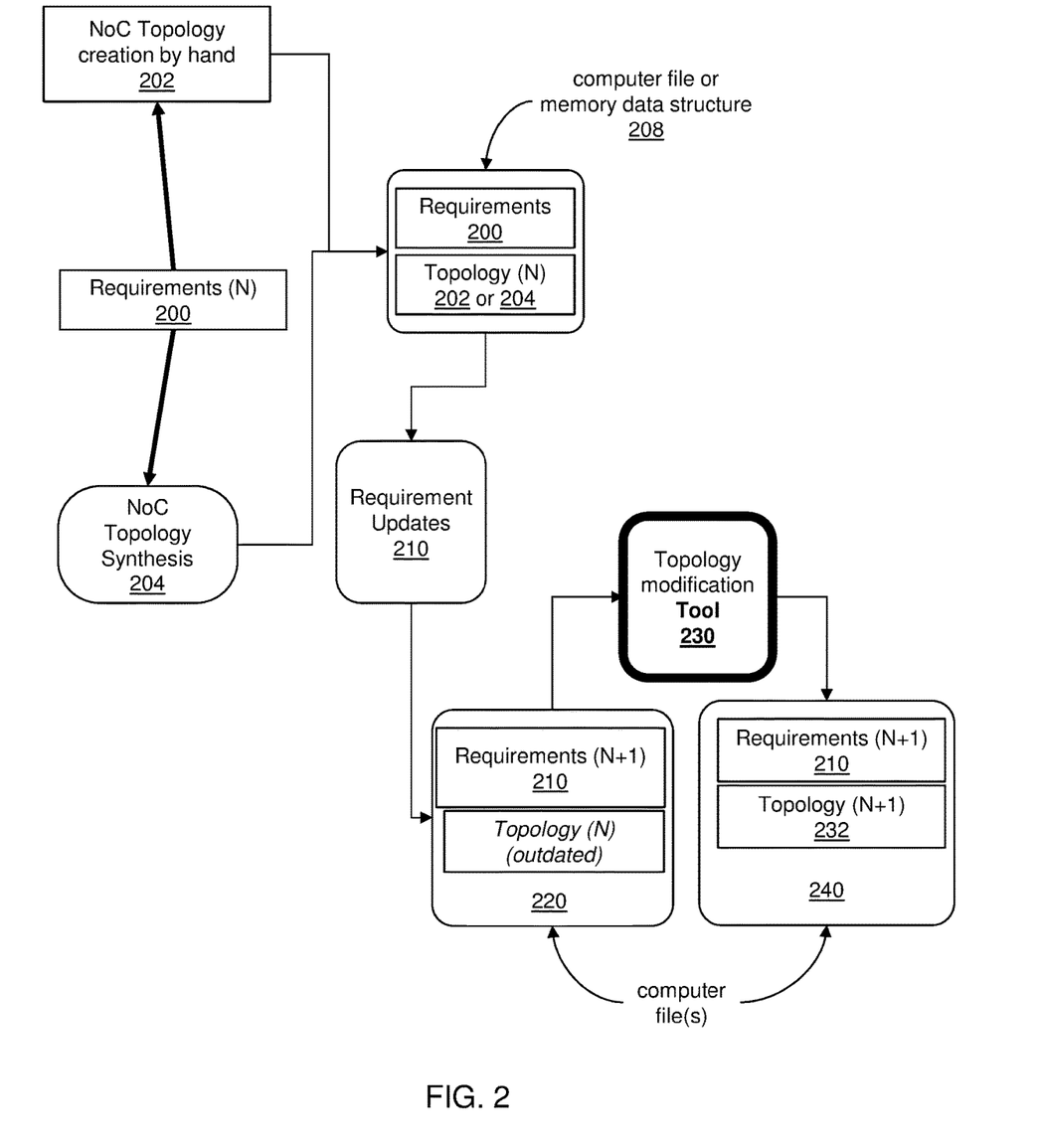
FIG. 2 shows a process for modifying an existing NoC topology to fulfill updated requirements in accordance with various aspects and embodiments of the invention.

Referring now to FIG. 2, a process is shown for modifying an existing topology of a NoC. Initial requirements (N) 200 of the NoC are provided as input. Based on the initial requirements (N) 200, a corresponding NoC topology 202 or 204 that satisfies these initial requirements 200 is provided or created. In some embodiments, the NoC topology 202 is created by hand, such as by a designer. In some embodiments, the NoC topology 204 is automatically created using a NoC topology synthesis module or tool. Both the initial requirements 200 and the corresponding NoC topology 202 or 204 are described in a computer readable representation 208, such as computer files or in-memory data structures.

The initial requirements 200 are updated (e.g., updated, new, and/or revised), resulting in updated requirements 210. The existing NoC topology 202 or 204 is now outdated, as it does not satisfy the updated requirements (N+1) 210. The updated requirements (N+1) 210 and the now outdated existing NoC topology 202 or 204 are again made available in a computer readable representation 220, such as computer files or in-memory data structures.

A topology modification tool 230 receives the updated requirements 210 and the existing NoC topology representation 202 or 204 and modifies the outdated existing NoC topology representation 202 or 204 to generate a NoC topology representation 232 that satisfies the updated requirements 210.

Figure 3:
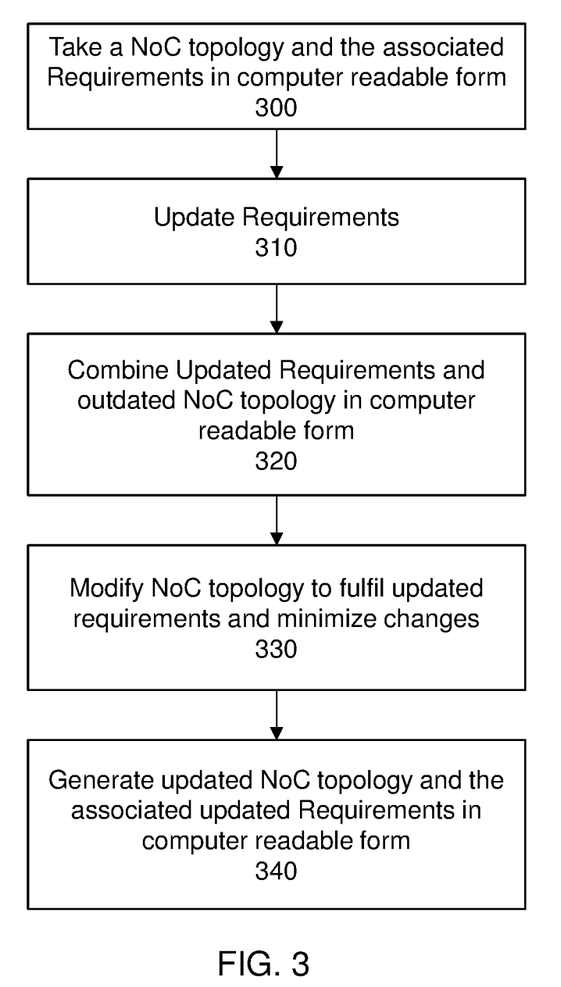
FIG. 3 shows a process used by a topology modification tool for updating a NoC topology in accordance with various aspects and embodiments of the invention.

Referring additionally to FIG. 3, a process is shown, that is used by the topology modification tool 230 for generating the updated NoC topology 232 that is associated with the updated requirements 210. At step 300 an NoC topology 202 or 204 and associated requirements 200 are provided in computer readable form. At step 310 the requirements are updated. Once the requirements 200 are updated, the initial NoC topology 202 or 204 becomes outdated. At step 320, the topology modification tool 230 combines the updated requirements 210 and the outdated existing NoC topology in a computer readable format.

At step 330, the topology modification tool 230 modifies the existing NoC topology 202 or 204 to fulfill the updated requirements 210. Each incremental modification includes minimizing a number of changes to existing components in the existing topology. Minimizing the changes includes preserving names of the existing components in the initial NoC topology.

At step 340 the updated NoC topology 232 is generated and provided, along with the updated requirements 210, in computer readable format 240.

Figure 4:
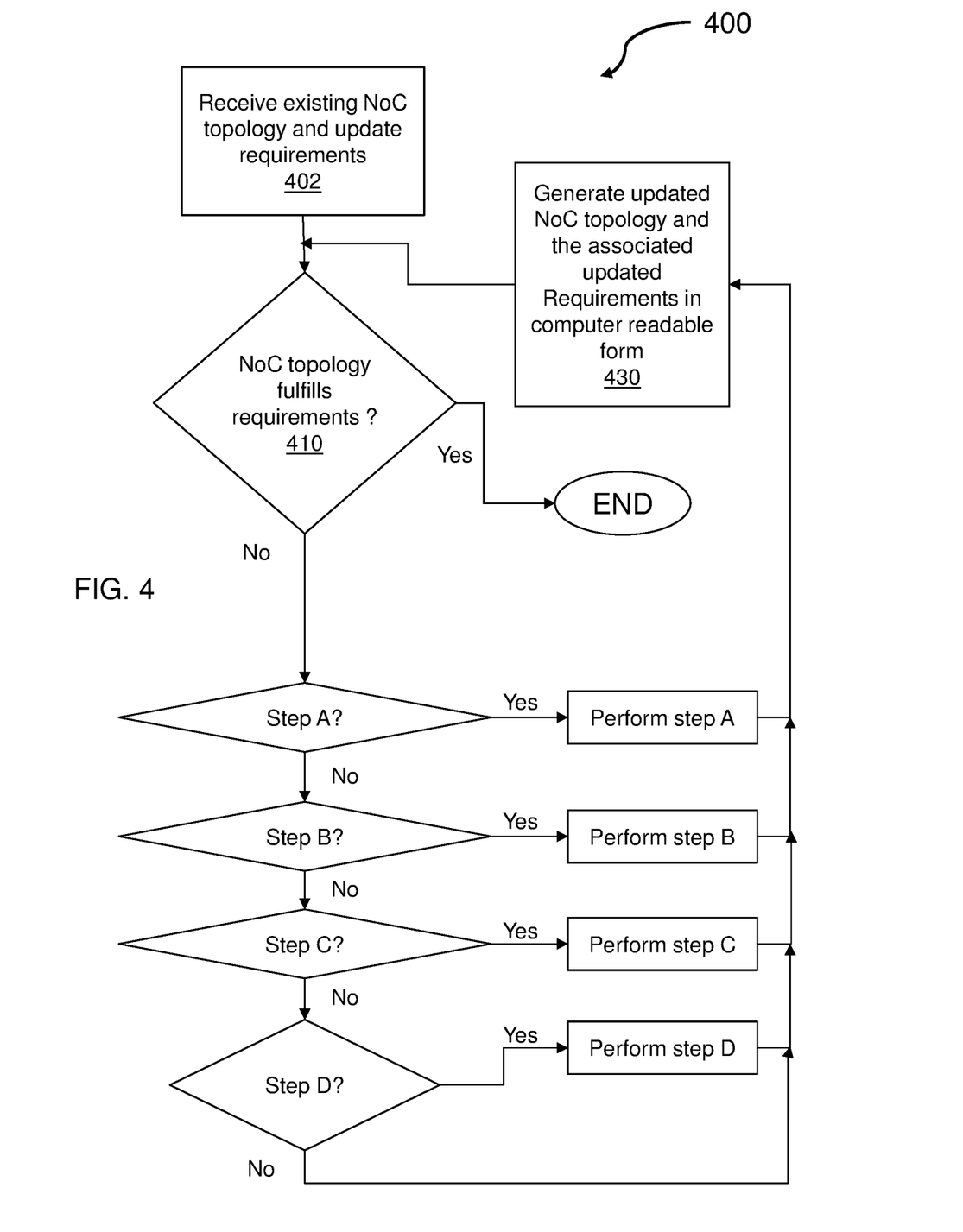
FIG. 4 shows a process for updating a NoC topology in accordance with various aspects and embodiments of the invention.

Referring additionally to FIG. 4, an example of the tool's process 400 for updating the NoC topology is shown. The process 400 is used by the tool 230 to update the NoC topology 202 or 204 in incremental steps and aligns the NoC topology 202 or 204 with the updated requirements 210. The number of steps depend on the type of update to the requirements. The number of steps shown and the order shown, in which these steps are executed or called, is but one non-limiting example. In some embodiments, the order of the steps may be changed. In some embodiments, there may be more steps (not shown).

At step 402, the topology modification tool 230 receives the outdated existing NoC topology 202 or 204 and the updated requirements 210 in computer readable format. At step 410, the tool 230 determines if the NoC topology 202 or 204 fulfills the updated requirements 210 or if there is an error (that is, the updated requirements 210 are not satisfied).

The tool 230 is responsible for deciding if the execution of a modification step A, B, C and/or D is required and which step is required. The tool's process 400 determines which of the steps A, B, C, and/or D are executed, in what combination, and in what order in order to fulfill the update requirements. Examples of steps A, B, C and D are described in greater detail below in accordance with the various aspects and embodiments of the invention.

At each step A, B, C, and D, the tool 230 takes the updated requirements and a NoC topology as input. Each step A, B, C and D uses the updated requirements and produces a (possibly) modified NoC topology as output. The generated NoC topology at the end of one step A, B, C or D might still not fulfill the updated requirements 210.

At block 430, a modified topology is generated after each step A, B, C and/or D is performed. In this manner, modification of the NoC topology is incremental.

If the modified NoC topology fulfils the updated requirements 210 (block 410), then the process is completed. The modified topology is outputted in computer readable form. The process 400 may be terminated if an error is detected at step 410, such as impossibility to fulfill the updated requirements completely.

A method herein offers an improvement over conventional NoC topology modification. Thus, minimized are delays and errors that result from incremental synthesis runs, such as two consecutive synthesis runs, when there is an update/new requirement. Consequently, cost and time of performing the modifications is reduced.

Figure 5:
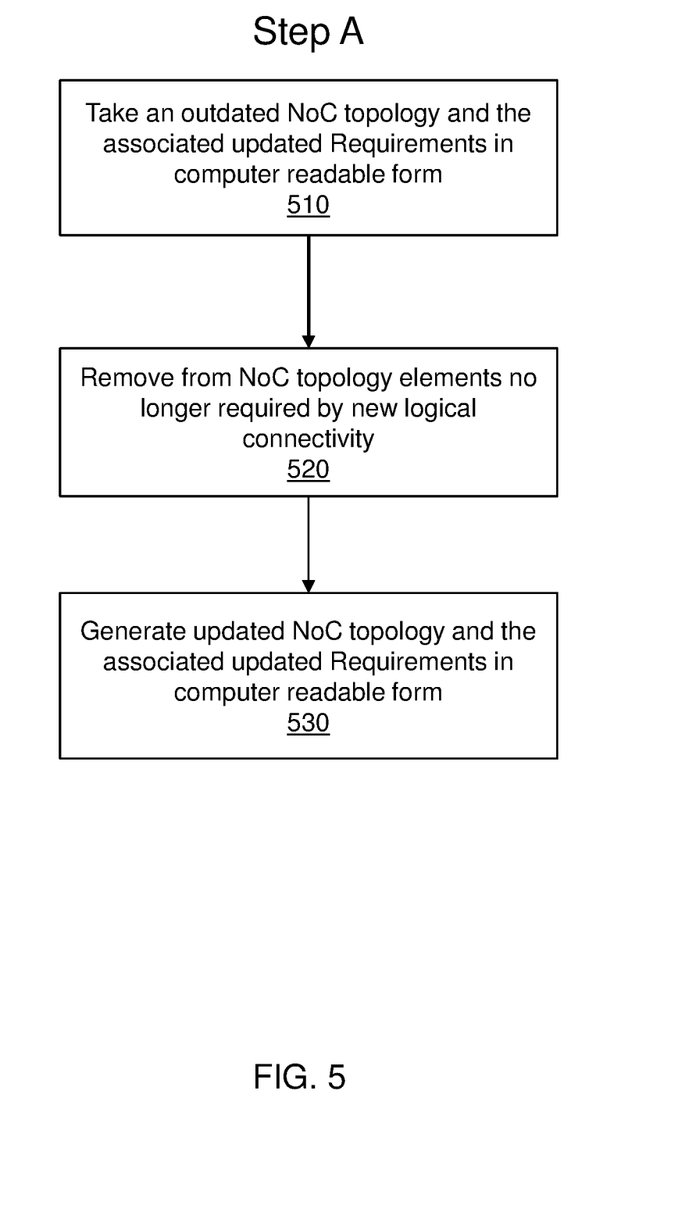
FIG. 5 shows a step of the process of FIG. 4 in accordance with various aspects and embodiments of the invention.

Referring now to FIG. 5, at step A of FIG. 4, the topology modification tool 230 examines the NoC elements and connections that are now outdated or useless due to the fact that the connectivity they implemented in the outdated NoC topology is no longer present in the updated requirements (blocks 510 and 520). The process removes the unnecessary elements. The tool 230 then generates and provides an updated NoC topology and the associated update requirements in a computer readable format (block 430 of FIG. 4).

Figure 6:
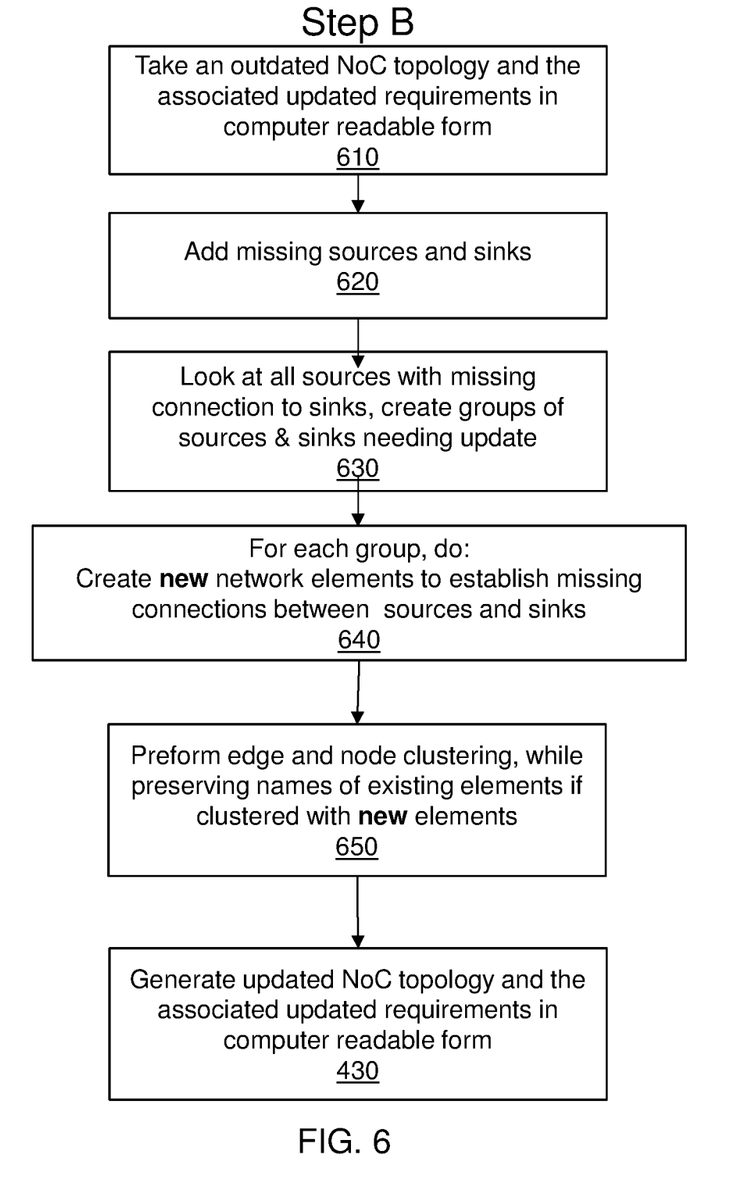
FIG. 6 shows a step of the process of FIG. 4 in accordance with various aspects and embodiments of the invention.

Referring now to FIG. 6, at step B of FIG. 4, the topology modification tool 230 considers NoC sources and sinks of traffic that are missing, and adds the missing sources and sinks to support the traffic (blocks 610 and 620).

In some instances, connection of the NoC to new initiators and/or new targets may require new NIUs, which are sources and sinks of traffic. Then, sources and destinations of traffics are examined and sources and destinations, which have missing connectivity, are grouped (block 630). A group may have as few as one element with missing connectivity. A group may have as many as all of the elements with missing connectivity. For each group of such elements with missing connectivity, new network elements are created, if needed, and new connections between elements are created, if needed (block 640). Newly created elements and connections are tagged as new. Elements not tagged as new are tagged as old.

The type or kind of new elements that might be created includes new switches. The kind of new connections that might be created includes connections between new switches, between new switches and old (existing) switches, and between old (existing) switches.

The topology modification tool 230 then performs node and edge clustering (block 650). Node clustering combines multiple NoC elements into one. For example, multiple switches might be combined into a single switch. Thus, step B ensures that if new switches are combined with old switches, the name of the resulting switch is chosen amongst the names of the old switches. Edge clustering combines multiple connections between NoC elements into one. When this occurs, step B ensures that if new switches are combined with old switches, which is due to the edge clustering process, the name of the resulting switch is chosen amongst the names of the old switches. Thus, step B preserves the maximum of old switches names, even if the old switches have new connectivity.

The tool 230 then generates and provides an updated NoC topology and the updated requirements in a computer readable format (block 430 of FIG. 4).

Figure 7:
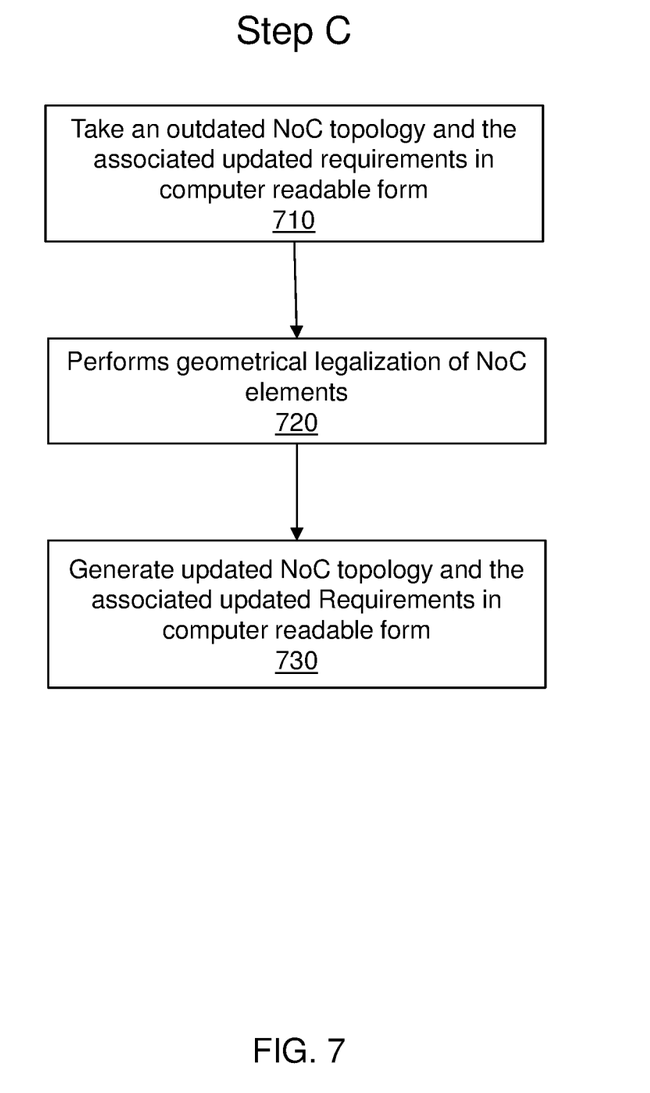
FIG. 7 shows a step of the process of FIG. 4 in accordance with various aspects and embodiments of the invention.

Referring now to FIG. 7, at step C of FIG. 4, the topology modification tool 230 examines the outdated NoC topology for illegal positions (block 710). Certain NoC elements may be at illegal positions of the floorplan due to changes of the floorplan. The elements at illegal positions are moved to legal locations (block 720). As an option (not shown), the topology modification tool 230 may attempt to minimize NoC wire lengths, which is the aggregated length of NoC connections between elements. The topology modification tool 230 then generates and provides an updated NoC topology and the update requirements in a computer readable format (block 430 of FIG. 4).

Figure 8:
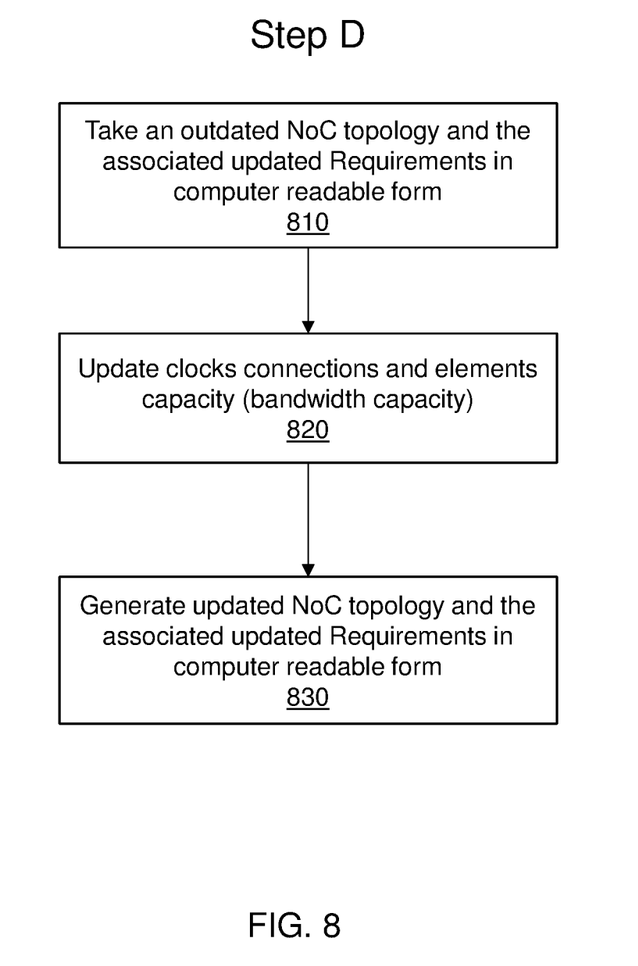
FIG. 8 shows a step of the process of FIG. 4 in accordance with various aspects and embodiments of the invention.

Referring now to FIG. 8, at step D of FIG. 4, the topology modification tool 230 updates timing of existing NoC elements. For instance. changes the way the NoC elements are connected to a clock and updates the configuration to fulfill the updated requirements. The connection of NoC elements to a clock (NoC elements have a clock input because they are built with digital logic components) and NoC element configurations, such as the width of the packets FLITS they carry, is updated to adapt the NoC performances to the updated requirements (blocks 810 and 820). The NoC performance metrics considered are the ones described in the updated requirements. A non-limiting example of such a requirement is minimum bandwidth between a source and a sink in a certain traffic scenario. Another non-limiting example is gate count. Another non-limiting example is power consumption. The topology modification tool 230 then generates and provides an updated NoC topology and the update requirements in a computer readable format (block 430 of FIG. 4).

In some aspects and embodiments, the tool's process may be used to for only sub-sections of the NoC.

Certain methods herein may be performed by instructions that are stored upon a non-transitory computer readable medium. The non-transitory computer readable medium stores code including instructions that, if executed by one or more processors, would cause a system or computer to perform steps of a method described herein. Examples of the non-transitory computer readable medium include a rotating magnetic disk, a rotating optical disk, a flash random access memory (RAM) chip, and other mechanically moving or solid-state storage media.

Certain examples have been described herein and it will be noted that different combinations of different features from different examples may be considered. Salient features are presented to better explain examples; however, it is clear that certain features may be added, modified and/or omitted without modifying the functional aspects of these examples as described.

As for the NoC, examples of IP elements or units include processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others.

Some examples are one or more non-transitory computer readable media arranged to store such instructions for methods described herein. Whatever machine holds non-transitory computer readable media comprising any of the necessary code may implement an example. Some examples may be implemented as physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments shown and described herein. Rather, the scope and spirit of present invention is embodied by the appended claims.

What is claimed is:

1. A non-transitory computer readable medium comprising code that, when executed, causes a topology modification tool to:
   receive an initial Network-on-Chip (NoC) topology that satisfies and is based on initial requirements, wherein the initial NoC topology includes elements and connections;
   receive an update to the initial requirements, wherein the update results in updated requirements;
   make incremental modifications to a portion of the initial NoC topology that is impacted by the updated requirements in order to satisfy the updated requirements and generate an incremental updated NoC topology, each incremental modification is in response to the update and changes existing components in the initial NoC topology, wherein the incremental modifications result in the initial NoC topology being outdated resulting in at least one of an unnecessary element and an unnecessary connection;
   remove at least one of the unnecessary element and the unnecessary connection;
   automatically generate an updated NoC topology that combines the initial NoC topology with the incremental updated NoC topology that satisfies the update; and
   generate a computer readable format of the updated NoC topology thereby minimizing delays and costs resulting from topology modifications,
   wherein minimizing changes includes preserving names of the existing components from the initial NoC topology in the updated NoC topology.

2. The medium of claim 1, wherein the updated requirements are an update to the initial requirements.

3. The medium of claim 1, wherein the existing components include network components and connections between the network components.

4. The medium of claim 1, wherein the incremental modifications include eliminating a component and/or connection that is no longer needed.

5. The medium of claim 1, wherein the incremental modifications include adding components that are missing and preserving the names of the existing components includes using node clustering to cluster the added components with the existing components to produce a clustered added components, and refer to the clustered added components by the existing components' names that formed part of the clustered added components.

6. The medium of claim 5, wherein preserving the names of the existing components further includes using edge clustering to combine connections.

7. The medium of claim 1, wherein generating the updated NoC topology includes moving the existing components to legal locations, and minimizing connection lengths.

8. The medium of claim 1, wherein generating the updated NoC topology includes updating timing of the existing components.

9. A computer-implemented method for generation of an updated topology, the method comprising:
   receiving an initial Network-on-Chip (NoC) topology that satisfies and is based on initial requirements, wherein the initial NoC topology includes elements and connections;
   receiving an update to the initial requirements, wherein the update results in updated requirements;
   making incremental modifications to a portion of the initial NoC topology that is impacted by the updated requirements in order to satisfy the updated requirements and generate an incremental updated NoC topology, each incremental modification is in response to the update and changes existing components in the initial NoC topology, which becomes outdated and results in at least one of an unnecessary element and an unnecessary connection, and preserves names of the existing components in the initial NoC topology;
   removing at least one of the unnecessary element and the unnecessary connection;
   generating an updated NoC topology that combines the initial NoC topology with the incremental updated NoC topology that satisfies the update; and
   generating a computer readable format of the updated NoC topology thereby minimizing delays and costs resulting from topology modifications.

10. The method of claim 9, wherein the incremental modifications include adding components that are missing, and wherein preserving the names of the existing components includes using node and edge clustering to cluster the added components with existing components to produce clustered added components, and refer to the clustered added components by the existing components' names that formed part of the clustered added components.

11. The method of claim 9, wherein generating the updated NoC topology includes moving existing components to legal locations, and minimizing connection lengths.

12. The method of claim 9, wherein generating the updated NoC topology includes updating timing of existing components.

13. A computing system comprising a processor and computer-readable memory encoded with instructions that, when executed, cause a topology modification tool to:
   receive an initial Network-on-Chip (NoC) topology that satisfies and is based on initial requirements, wherein the initial NoC topology includes elements and connections;
   receive an update to the initial requirements, wherein the update results in updated requirements;
   make incremental modifications to a portion of the initial NoC topology that is impacted by the updated requirements in order to satisfy the updated requirements and generate an incremental updated NoC topology, each incremental modification is in response to the update and changes existing components in the initial NoC topology, wherein the incremental modifications result in the initial NoC topology being outdated including at least one of an unnecessary element and an unnecessary connection;
   remove at least one of the unnecessary element and the unnecessary connection;
   generate an updated NoC topology that combines the initial NoC topology with the incremental updated NoC topology that satisfies the update; and
   generate a computer readable format of the updated NoC topology thereby minimizing delays and costs resulting from topology modifications, wherein minimizing changes includes preserving names of the existing components, which are part of the initial NoC topology, in the updated NoC topology.

14. The system of claim 13, wherein the existing components include network components and connections between the network components.

15. The system of claim 13, wherein the incremental modifications include adding components that are missing, and wherein preserving the names of the existing components includes using node and edge clustering to cluster the added components with the existing components, and refer to the cluster by an existing name.

16. The system of claim 13, wherein generating the updated NoC topology includes moving the existing components to legal locations, and minimizing connection lengths.

17. The system of claim 13, wherein generating the updated NoC topology includes updating timing of the existing components.

* * * * *